United States Patent [19]

Sciaky

[11] 3,993,889

[45] Nov. 23, 1976

[54] SEAM TRACKING METHOD IMPROVEMENT

[75] Inventor: Albert M. Sciaky, Palos Park, Ill.

[73] Assignee: Sciaky Bros., Inc., Chicago, Ill.

[22] Filed: Feb. 19, 1976

[21] Appl. No.: 659,541

[52] U.S. Cl. .................. 235/151.1; 219/121 EM; 219/125 PL
[51] Int. Cl.² ................. G06G 7/48; B23K 15/00
[58] Field of Search ............ 235/151.1, 151, 151.11; 219/121 EB, 121 EM, 121 R, 124, 125 R, 125 PL; 250/396; 318/572, 576

[56] References Cited
UNITED STATES PATENTS

| | | | |
|---|---|---|---|
| 3,426,174 | 2/1969 | Graham et al. | 219/121 EM |
| 3,519,788 | 7/1970 | Hatzakis | 219/121 EM |
| 3,588,463 | 6/1971 | Best | 318/576 X |
| 3,648,009 | 3/1972 | Steigerwald | 219/121 EM |
| 3,743,776 | 7/1973 | Corcelle et al. | 219/121 EB |
| 3,775,581 | 11/1973 | Sciaky | 219/121 EM |

*Primary Examiner*—Joseph F. Ruggiero
*Attorney, Agent, or Firm*—Julius L. Solomon

[57] ABSTRACT

This invention is for a method for controlling the motion of an electron beam gun with respect to a workpiece so that the electron beam will follow the path along the seam between the two parts which are to be welded. The electron beam scans the seam in a circular motion. The center of the circle is offset a distance equal to the radius of the circle ahead of the resting position of the electron beam in the direction of travel, by applying the signals R (sin $\omega t$ + sin $\theta$) and R (cos $\omega t$ + $\theta$) to deflection coils which deflect the beam along two mutually perpendicular axes whose origin is at the resting position of the beam. Control of the motion of the electron beam gun with respect to the workpiece is achieved from signals derived as the seam is scanned by the circular motion of the electron beam in the area including the seam. The signals are in the form of pulses generated by the reduction in secondary and reflected electrons as the electron beam traverses the seam. These pulses bear a phase relationship to a reference sinosoid and are processed in the control so as to provide the sine and cosine of the angle the path takes with respect to a reference axis. From the sine and cosine terms the X and Y motion components are derived and fed to servo operators which drive the gun with respect to the work along the two mutually perpendicular axes so that the gun motion is always tangential to the path at a desired fixed velocity.

6 Claims, 20 Drawing Figures

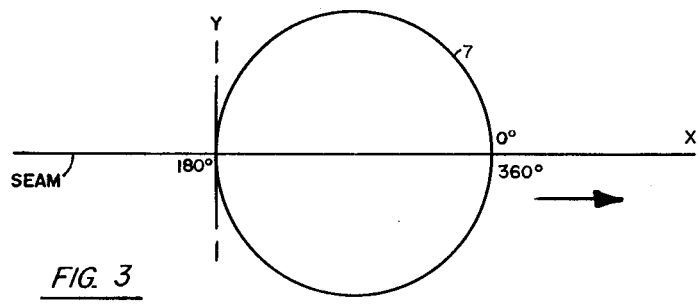
FIG. 3
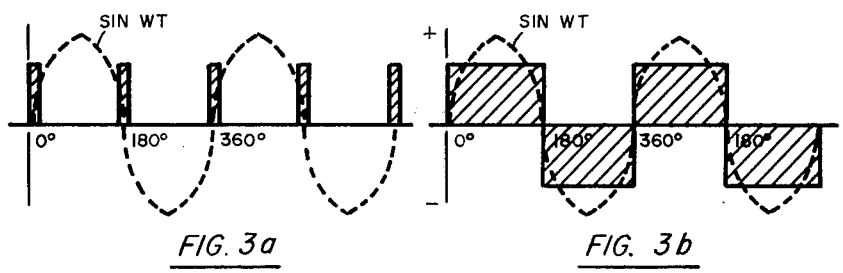
FIG. 3a  FIG. 3b
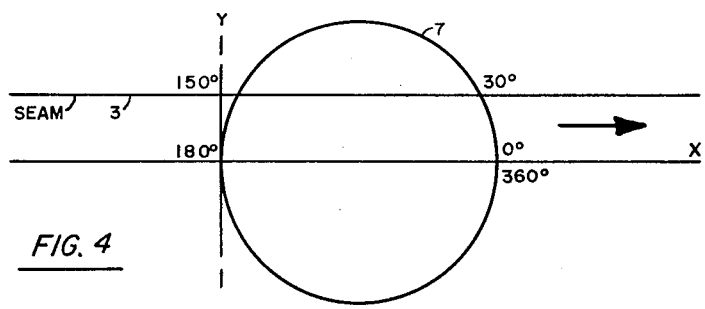
FIG. 4
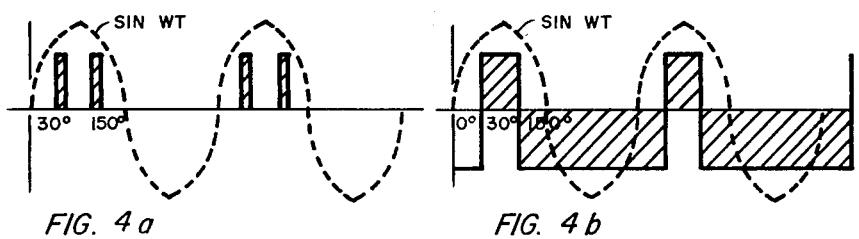
FIG. 4a  FIG. 4b
FIG. 5
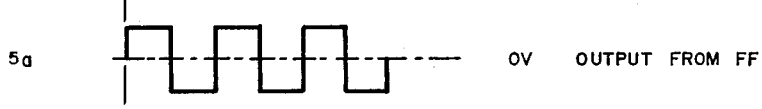
5a  OV  OUTPUT FROM FF
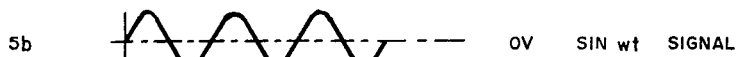
5b  OV  SIN wt SIGNAL
5c  OV  COS θ SIGNAL
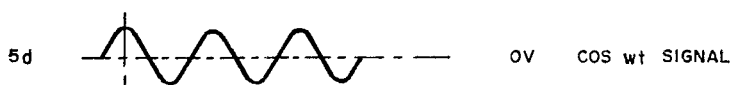
5d  OV  COS wt SIGNAL
5e  OV  SIN θ SIGNAL

SEAM TRACKING METHOD IMPROVEMENT

This invention is related generally to electron beam welding apparatus and, more specifically, to a method and apparatus for use in an electron beam welding system which provides means for automatically causing the electron beam to follow any path on the work along which it is desired that the beam impinge so as to produce a continuous weld along that line. In a typical electron beam welding machine the relative motion between the work and the gun may be effected in at least two ways. In one method the gun is fixed and the work is mounted upon a carriage which may be driven simultaneously along two mutually perpendicular axes with separate driving means for the X- and Y-axes so that the relative motion between the gun and the work may be made to follow a straight line or a curved path. A second and more practical method is to use a gun which is movable within the chamber and may be driven along one of the axes while the carriage is provided with a drive which moves the carriage back and forth along the second axis. In electron beam welding, the edges of the two parts which are to be welded together are formed so that they adjoin with as little gap between the parts as is practically obtainable. If the seam is along a straight line the work is lined up so that it is parallel to the direction of motion of the carriage, the electron beam positioned so that the beam strikes the work at one end of the seam, and the carriage then set into motion so that the beam strikes the work progressively along the full length of the seam while moving at a preset velocity. If the seam path is not a straight line, then the work may be moved in relation to the electron gun by manual manipulation of the means for positioning the gun with respect to the work. This procedure, however, requires great skill and much practice and can only be utilized when the desired welding speed is extremely low. Furthermore, it is not likely that the tangential speed of the electron beam with respect to the work could be maintained constant by manual manipulation of the X- and Y-axes carriage operators. Systems have been devised in the past for tracking a seam but, if purely mechanical, they require special preparation of the parts so as to form a groove at the top of the seam into which a mechanical finger may be placed, or, if an optical method is utilized, a stripe of either black or white paint must be painted parallel and close to the seam to be welded. However, one disadvantage of this is that the paint contaminates and causes defects in the weld.

U.S. Pat. No. 3,775,581 of Nov. 27, 1973, granted to Albert M. Sciaky describes a seam tracking method directed towards overcoming the disadvantages mentioned above. In the prior Sciaky invention, the seam is tracked through the use of an electron beam of low power density which is used to scan the seam while it traverses a circular path which crosses the seam. Each time the beam crosses the seam a pulse is generated whose angular position along the circuit path marked out by the beam on the work may be determined with reference to a set of X- and Y-coordinates whose axis is at the center of the circle swept out by the electron beam. The signals derived are processed electronically in order to derive the sine and cosine of the angle between the X-axis and the line between the points at which the beam crosses the seam. Should the center of the swept circle be shifted from this line a position error signal is generated which acts upon servo amplifiers which drive the gun and the work with respect to each other along two axes which are mutually perpendicular producing a resultant motion normal to the direction of the seam. The position error signal acts continuously to maintain the rest position of the beam on this line at all times. The sine and cosine of the angle of path direction with respect to the X-coordinate reference are utilized to produce the X- and Y-axis component of the desired relative velocity along the seam, so as to result in a constant velocity of the gun with respect to the work along the desired path. In the prior invention the center of the X-Y coordinate system is at the rest position of the beam which also defines the center of the circular path swept out by the beam. The present invention differs in that the origin of the X-Y coordinate system while at the rest position of the beam is also at one of the points where the beam crosses the seam.

In applying the prior invention, it was found that the position of the beam with respect to the seam could be held in most cases with a deviation of approximately plus or minus five thousandths of an inch. For most welding applications this is sufficiently accurate, however there are some very critical applications where the tolerances are tighter and where the deviation must be held to less than five thousandths of an inch.

It is the object of the present invention to provide a method and apparatus by which the electron beam gun will follow the seam between two adjoining workpieces which are to be welded without appreciable deviation from the seam.

Another object is to provide a method and apparatus whereby the seam may be tracked at higher speeds than has been possible heretofore.

Another object is to provide a method and apparatus by which the tangential velocity of the electron beam with respect to the seam is maintained constant at a preset magnitude along the full length of the seam.

Another object of the invention is to provide a means whereby incremental positions of the beam with respect to the seam may be recorded in a numerical control memory be it punched or magnetic tape or magnetic drum and processed in a associated computer so as to provide control signals to the X- and Y-axis driving means on a machine which will position the gun properly along the path to an extremely close tolerance and cause the gun to move with respect to the seam at a fixed preset tangential velocity.

To illustrate the method utilized we may refer to the following figures:

FIGS. 3, 3a and 3b illustrate the form and phase relationship of signals generated in the control system when the electron beam is centered on the seam.

FIGS. 4, 4a and 4b illustrate the form and phase relationship of signals generated in the control system when the electron beam is offset from the seam.

FIGS. 5 to 5e are graphs illustrating the multiplication of the output of the flip-flop by the sine $\omega t$ and cosine $\omega t$ signals from the circle generator in order to obtain the cos and sine respectively of the angle taken by the seam with respect to the reference axis.

In association with the above mentioned control method and circuitry, a method of seam detection described in patent application Ser. No. 784,574 now U.S. Pat. No. 3,609,288 is utilized. In the latter method an electron beam is oscillated across the seam and secondary and reflected electrons resulting from the electron beam striking the work are collected and used to indicate the relative position of the beam with respect to the seam. There is a sharp drop in the secondary electron emission whenever the beam crosses the seam which results in a negative going pulse of secondary electron current.

Figure 1:
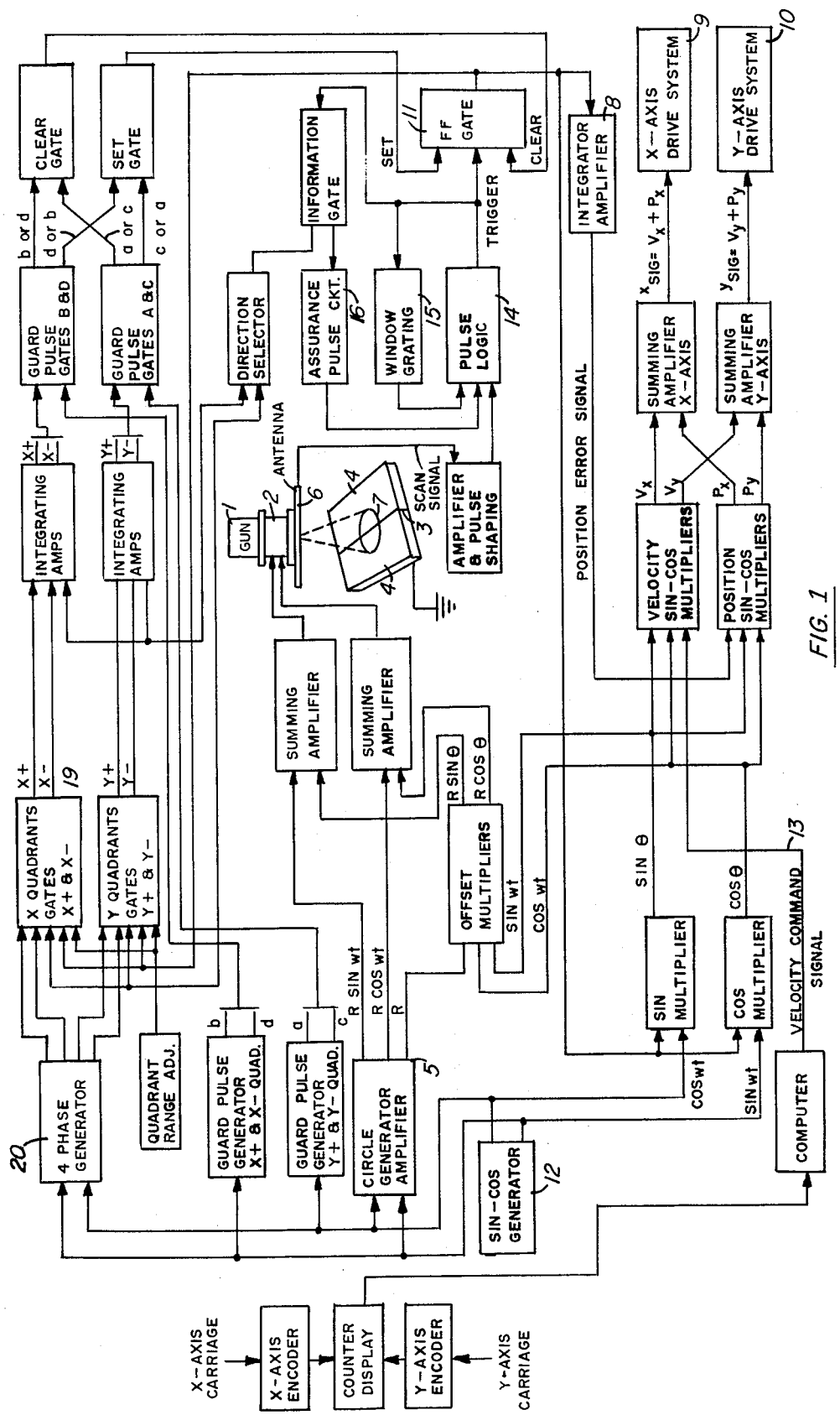
FIG. 1 is a block diagram illustrating steps of the method of control of the invention.

We refer now to FIG. 1 which is the block diagram illustrating the overall method. The electron gun 1 which incorporates an electron beam generating and focussing system and a beam deflection means, either electrostatic or electromagnetic, 2, is caused to generate an electron beam of low power density by adjusting its accelerating potential to 60 kilovolts, for example, and its beam current to 1 or 2 milliamperes.

The beam is directed towards the seam 3 between the adjoining workpieces 4. The deflection arrangement (2) which includes means for deflecting the beam along two mutually perpendicular axes which are at right angles to the undeflected path of the beam, is fed from a generator 12 in which are generated sine and cosine periodic wave form currents which are combined with signals derived from a system which determines the angle $\theta$ of the chord between the two points at which the beam, during its rotation, intersects the seam being tracked which when fed to the X- and Y-axis deflection coils, respectively, cause the beam to travel in a circular path whose center is offset by an amount equal to the radius of the circle which is determined by the distance from gun to the work and by the magnitude of the periodic current passing through the respective deflection coils. As the beam travels along its circular path, secondary and reflected electrons will be generated at the point where the electron beam strikes the work. Secondary electrons will be collected by the antenna 6 which is mounted below the focus coil and insulated therefrom and a current will be developed from the secondary electrons which have been collected as is explained in my application Ser. No. 784,574, now U.S. Pat. No. 3,609,288. Each time the electron beam traverses the leading edge of the seam between the two parts a pulse will be generated due to the sudden reduction in reflected signal picked up by the antenna. If the circular path of the beam is centered on the seam as in FIG. 3, two pulses 180° apart will be generated for each revolution of the beam, as shown in FIG. 3a. If the work is now moved in relation to the gun along the seam in such a way that the circle is always centered on the seam which indicates that with the beam at rest it would strike the seam as is desired, the pulses generated would all be an equal distance from each other at 180°. When viewed on a cathode ray oscilloscope a pattern would appear as in FIG. 3a of a series of pulses equidistant from each other. Should the beam be displaced from the seam the circular path will cross the seam as shown in FIG. 4 and the pulses on the cathode ray display would then not be equidistant but would alternate in distance from each other as in FIG. 4a. FIG. 3 illustrates the path 7 of the rotating beam upon the work. The beam is rotating counterclockwise about a center which is ahead of the origin of the coordinates X and Y and the gun is moving in the direction of the arrow with respect to the work so that the X-axis lies along the seam. The beam strikes the leading edge of the seam at zero degrees and again at 180°, again at 360°, etc. FIG. 4 illustrates the condition when the gun is offset for some distance in a direction at right angles to the seam. In this case a pulse will be generated not at zero degrees but at 30° and again at 150° and this will be repeated as long as the beam is rotated at that point or moved along a path parallel to the seam.

One purpose of the method of this invention is to maintain the electron beam centered about the seam along the desired path along the seam. The relative position of the pulses generated as explained above is utilized to determine the magnitude and direction of the position error, that is the displacement of the center of the beam with respect to the seam, should the electron gun stray from the desired path, and is utilized to control the servo amplifiers which direct the motion of the X- and Y-axes drive systems for displacing the gun with respect to the work so as to bring the center of the beam back to the seam. The position error is determined in the following manner. Each pulse generated, after amplification and shaping by suitable electronic circuitry, is delivered to a flip-flop gating system whose state changes from 1 to 0 or from 0 to 1 with each pulse delivered to its trigger circuit. As a result, a pattern will appear at the output of the flip-flop gate as shown in FIGS. 3b and 4b. FIG. 3b illustrates the output pattern resulting from the condition as shown in FIG. 3a and FIG. 4b illustrates the voltage pattern which will result from the condition illustrated in FIG. 4. The signals emanating from the flip-flop gate are integrated in the integrating amplifier 8 and it can be readily seen that the integration of wave form 3b would result in zero signal whereas the integration of the wave form 4b would result in a negative output voltage. It can readily be seen that had the gun been displaced in the opposite direction from that shown in 4 that pattern 4b would be flipped over and that the resulting indication would be a positive position error voltage. These position error signals are delivered to the X- and Y-axis drive systems and cause the drive to move the gun or work in the proper direction so as to correct for the error and bring the beam directly over the seam. Note that the motion does not contribut a component of velocity along the seam.

Figure 6:
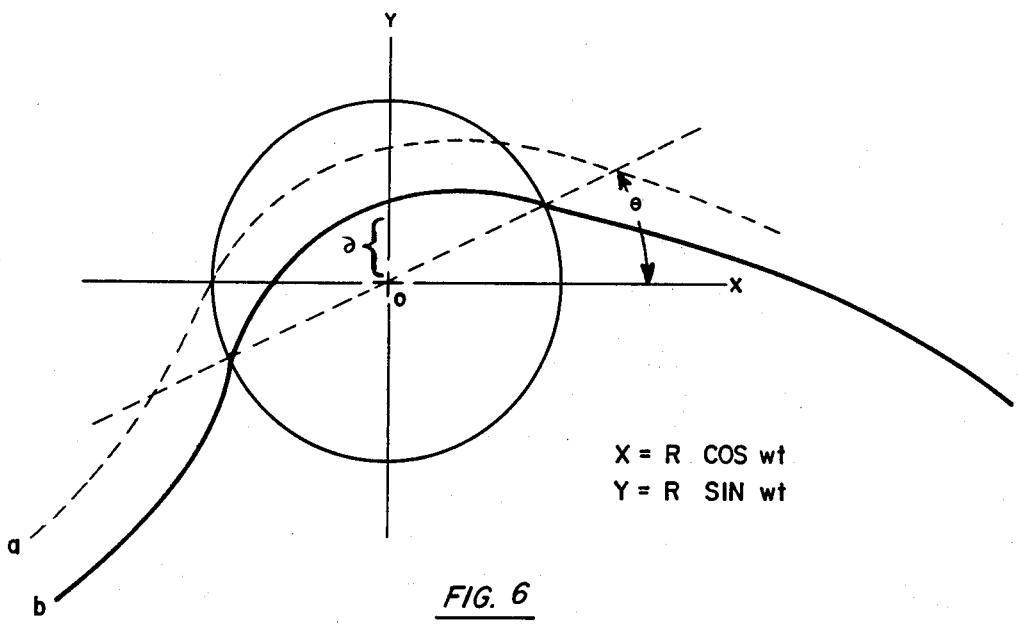
FIG. 6 illustrates the cause for positional errors when using the prior system.

In my prior invention the undeflected beam is at the origin of the deflection coordinate system and the deflection pattern is given by $$X = R \cos \omega t$$

$$Y = R \sin \omega t$$

so that the beam describes a circle whose center is at the rest position of the electron beam. When using this method, a systematic error is introduced which is dependent upon the radius of curvature of the seam to be followed and the radius of the scanning circle. The smaller the ratio of the seam curvature to the radius of the scanning circle the greater is the error. This is illustrated in FIG. 6. O defines the rest position of the beam, the line $a$ shows the initial seam displacement from the beam and the line $b$ shows the seam position with respect to the beam after the position error has been corrected by the system described above. As can be seen there remains a systemic error δ which limits the positioning error.

Figure 7:
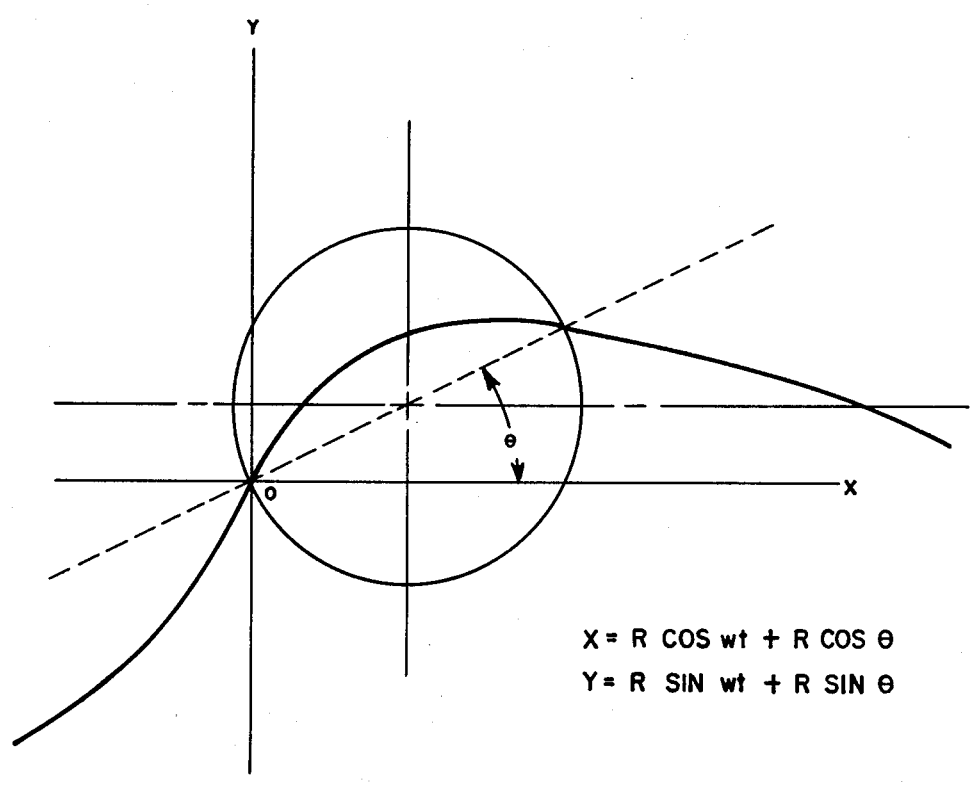
FIG. 7 illustrates how the error is removed when applying the new invention.

In the present invention this systemic error is brought to zero as illustrated in FIG. 7. In the new method the beam is deflected along the two axes whose center is at the resting position of the beam by voltages which follow the law $$X = R \cos \omega t + R \cos \theta \text{ and}$$

$$Y = R \sin \omega t + R \sin \theta$$

where θ is the angle defined by the line passing through the points crossed by the beam in its rotary motion. With the new method the beam after correction will be on the seam at the point O the origin of the coordinate system. With this system the beam is maintained on the seam through the action of the positioning system while the beam is moving along the seam at a fixed velocity as determined by the velocity components dynamically generated within the system.

Referring again to FIG. 1 we may note how the voltages are obtained which cause the beam to be deflected so as to generate a circle whose center is in advance of the beam by a distance equal to the radius of the circle. A sine cosine generator 12 delivers periodic signals sin ωt and cos ωt to a circle generator amplifier whose output may be varied to determine the radius R of the circle to be generated. The outputs of the circle generator 5 are R sin ωt, R cos ωt and R which may be determined by rectifying and filtering the alternating current signals after amplification in the circle generator. The signal proportional to R and the sin θ and cosine θ signals generated in the sine and cosine multipliers are fed to offset multiplier 21 whose output signals R sine θ and R cos θ are delivered respectively to summing amplifiers 17 and 18. The latter summing amplifiers also receive respectively the R sin ωt and R cos ωt signals from the circle generator amplifier 5. The output signals R (sin ωt + sin θ) and R (cos ωt + cos θ) from summing amplifiers 17 and 18 are fed to the deflection coil system which deflects the electron beam along the X- and Y-axes.

The apparatus utilized for practicing the method of the invention consists of well-known control elements which are arranged in the overall control so as to perform the desired functions. These elements include the well-known logic functions known as NOR, OR and AND functions, bi-stable flip-flop gates, amplifiers, pulse shapers, integrating amplifiers, summing amplifiers, multipliers, various combinations of NOR, OR and AND circuits which form gating systems for signals or pulses, and bi-directional servo systems which control the speed and direction of a motor as a function of the polarity and magnitude of DC signals which are fed to their input circuits. The structure and operation of some of these elements will now be explained in order that the method and operation of the overall system may more readily be understood.

Figure 2A:
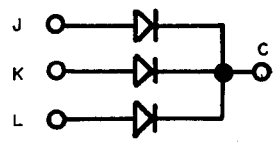
FIGS. 2a to 2f are schematic and symbolic drawings of logic circuits used in the control system of the invention.
Figure 2B:
Figure 2C:
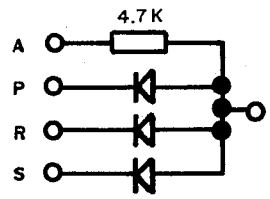
Figure 2D:
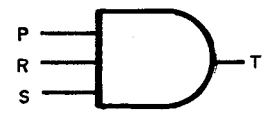

A typical OR circuit is illustrated schematically at FIG. 2a and symbolically at FIG. 2b. A typical AND circuit is illustrated in FIG. 2c schematically and FIG. 2d symbolically and a typical NOR circuit is shown schematically in FIG. 2e and symbolically in FIG. 2f. A multiplicity of the above logic elements is used as building blocks in the overall control system. Each of the building block circuits can be viewed as a two value element or circuit having either zeros or ones at its input or output terminals. The one value is considered as the full supply voltage, in most cases about plus 20 volts DC with respect to ground, and a zero value is considered as zero or some value near zero volts with respect to the ground. Referring now to the OR schematic shown in FIG. 2a, the application of a positive potential of 20 volts at any of the inputs J, K or L, will result in the appearance of a 20 volt signal at output terminal C. Since the 20 volt input signal is designated by a 1 we may say that the application of a 1 to any of the inputs of the OR will result in an output of 1 across the load which is connected between the output terminal C and the ground.

Figure 2E:
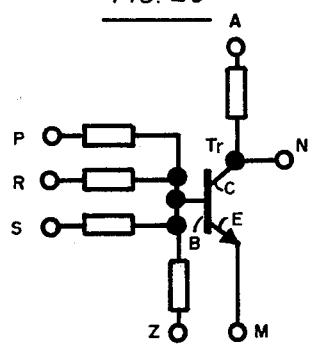
Figure 2F:
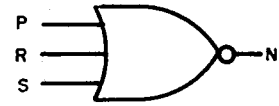

The AND gate illustrated in FIG. 2c is connected at its A terminal to a plus 20 volt power supply. A zero applied to any one of the P, R, and S input terminals will result in a flow of current through the associated diode and thus bring the output terminal T close to the ground potential or zero value. When the input terminals P and R and S are all brought to a plus 20 potential the diodes will cease conducting and the output terminal T will be brought to the potential of the power supply, 20 volts positive with respect to ground, which is the 1 value. In other words, when all the inputs are at 1, the output T will be at 1. When any of the inputs are at zero, the output will be at zero. The NOR gate illustrated in FIG. 2e is connected at its A terminal to the plus 20 volt power source and at its Z terminal to a negative 20 volt supply. When the input terminals P, R and S are supplied with a zero the transistor which is negatively biased by the minus 20 volts between terminal Z and the ground will be at cut off and there will be no collector-emitter current flowing so that the potential of the output terminal will be at the same potential as the plus 20 volts power supply connected to terminal A. If any of the input terminals are supplied with a plus 20 volt potential, base-emitter current will flow, the transistor will pass collector to emitter current to saturation and the potential between the output terminal N and ground will be the low voltage drop across the transistor junction which is designated a zero. In other words, a 1 at any of the input terminals P, R and S results in a zero at the output terminal N. Zero inputs to all of the input terminals P, R and S will result in a 1 output at N.

A second purpose for the method of the invention is to direct the motion of the gun with respect to the work so that the tangential velocity remains constant along the desired path, which may take any form depending upon the shape of the seam between the two parts. This path may be circular, eliptical or square in those cases where it is necessary to weld inserts into plates. The electron gun is moved with respect to the work by means of two drive systems 9 and 10 which drive the gun with respect to the work along axes which are mutually perpendicular. The desired direction of motion must therefore be broken down into X- and Y- components at right angles to each other which will result in a desired constant tengential velocity along the desired path. This is accomplished by the following method:

The output signal from the flip-flop gate 11 is multiplied by the sine ωt and the cosine ωt of the periodic voltages which are fed from the sine-cosine generator 12 to the deflection coils 2 to generate the circular motion 7 of the beam. If we consider the case where the beam is oriented as indicated in FIG. 3 which would result in a square wave output from the flip-flop which is in phase with sine $\omega t$, as in 3b, we will find that the product of the output from the flip-flop and the sine $\omega t$ voltage results in a voltage having the wave form shown in 5c which, when integrated, will produce a maximum voltage output to which we may assign the level 1. This output will be proportional to the cosine of $\theta$, theta being the angle between the X-axis of the rotating beam and the actual direction of the seam at that point. We also find that the multiplication of the output wave form from the flip-flop by cosine $\omega t$ of the current feeding the deflection coils results in a wave form as illustrated in 5e which, when integrated, produces an output voltage of magnitude 0 which is the sine of 0°. This multiplication produces a signal which is proportional to the sine of the angle between the X-axis of the rotating beam and the direction of the seam. If we multiply the analog of the desired velocity by these analog voltages of the cosine $\theta$ and sine $\theta$, respectively, we will obtain two voltages, one being the analog of the velocity component along the X-axis obtained by multiplying the desired velocity command signal by the cosine $\theta$, and the second the Y-component of velocity obtained by multiplying the desired velocity command signal by the sine of $\theta$. These signals control the velocity respectively of the X-axis drive system 9 and the Y-axis drive system 10 so that the gun 1 is moved with respect to the work 4 along the desired path 3 at the desired velocity, as preset by the velocity command signal 13. The system as described above will deliver the signals of the proper magnitude and sign so that the beam is kept on the seam at all times and so that the motion of the electron gun with respect to the work is in the proper direction along the seam and at the desired tangential velocity.

Should an extraneous pulse, such as electrical noise, cause the flip-flop gate to switch at a point where the beam is not traversing the seam, or if a proper pulse is not generated at the time the beam does traverse the seam, the output signals from the flip-flop gate will be switched in phase relationship with the sine $\omega t$ and cosine $\omega t$, the fixed signals driving the circle generator, with the result that the voltages fed to the X- and Y-axes drive systems will be reversed in polarity so that the drives will move in a direction opposite to that desired.

In order to prevent this type of action, the assurance pulse system comprising the information gate, the assurance pulse circuit 16, window gating 15 and pulse logic 14 is provided, as is explained in my U.S. Pt. No. 3,775,581.

Provision is also made so that the control system may retain its sense of direction when scanning pulses disappear entirely for short periods of time. The Guard Pulse Gate System comprising, the guard pulse generators, four phase generator 20, X and Y guadrant gates, 19, guard pulse generator and associated gates, as explained in U.S. Pat. No. 3,775,581, performs this function.

The above described system will generate signals which, when fed to their respective X-axis and Y-axis drive systems, cause the electron beam gun to faithfully follow the seam to be welded. By installing X- and Y-axis encoders on the X- and Y-axis carriages, respectively, the X- and Y-axis coordinates of the position of the gun may be displayed continuously to an accuracy of one ten-thousandth of an inch, for example. These numbers may be fed to a computer and recorded in a suitable memory circuit and then processed so that a straight line interpolation of the path may be made to some preset deviational tolerance. This latter information may be retained in a magnetic memory and used to control the position of a second electron beam welding gun which may be installed behind the gun which is utilized to detect and follow the seam by making proper allowance for the difference in position of the two guns. Or the information in the computer memory may be utilized to direct the same gun which has been used to track the seam so that during the welding operation it will follow that seam as it is directed by the information which has been generated by the computer.

While a certain preferred embodiment of the invention has been specifically disclosed, it is understood that the invention is not limited thereto as many variations will be readily apparent to those skilled in the art and the invention is to be given its broadest possible interpretation within the terms of the following claims.

What I claim is:

1. A method for controlling the motion of an electron gun so that the beam generated by said gun follows, at a constant tangential velocity, the seam along which two parts to be welded adjoin, comprising the steps of;

generating, accelerating and focusing an electron beam;

directing the beam so that in its at rest position it impinges upon the work at a point close to the said seam;

deflecting the beam, so that it follows a circular path which crosses the said seam twice during each revolution of said beam, by applying two periodically varying magnetic or electrostatic forces normal to said beam along mutually perpendicular axes, one of said forces directed along one of said axes and varying in proportion to R (sine $\omega t$ + sine $\theta$) and a second of said forces directed along the other of said axes and varying in porportion to R (cosine $\omega t$ + cosine $\theta$);

generating an electric pulse each time the beam crosses the said seam;

supplying the said pulse to a bistable electronic circuit so as to produce at the output of said circuit a periodic alternating rectangular voltage wave which alternates between two voltage levels in synchronism with each successive pulse;

integrating the said rectangular voltage wave, by electronic means, and thus producing a position error signal which represents the deviation of the rest position of the beam from the seam;

multiplying, by electronic means, the said voltage wave by a periodic voltage varying as the sine $\omega t$ and simultaneously multiplying, by other electronic means, the said voltage wave by a periodic voltage varying as the cosine $\omega t$, so as to obtain separate product voltages which represent respectively the cosine and sine of an angle $\theta$ formed by the chord between the points of intersection of the rotating beam and the seam, and the first of aforesaid axes;

multiplying, by electronic means, the said position error signal respectively by separate voltages representing the said sine $\theta$ and cosine $\theta$ so as to obtain the position error components with respect to the aforesaid axes;

multiplying, by electronic means, a voltage which represents a desired tangential velocity for the beam respectively by the separate voltages representing the sine and cosine of the angle $\theta$ between the seam and the said axis so as to obtain separate voltages representing the components of the said tangential velocity along each of the said axes;

summing the voltages representing the positional error and the component of the tangential velocity along one of said axes, by electronic means, and summing the voltages representing the positional error and the component of tangential velocity along the second of said axes, by other electronic means, so as to obtain separate control signals and;

feeding the said signals to a pair of electronic servo systems which drive the gun along the two axes so as to cause the gun to move at a fixed tangential velocity along a path parallel to the said seam.

2. A method for controlling the motion of an electron beam gun, as in claim 1, in which the aforesaid pulses are generated by the steps of collecting secondary and reflected electrons generated by the beam impinging upon the work, directing the said electrons to a pulse amplifier and shaping circuit, causing the variations in sescondary electrons collected to be amplified and generating a pulse of fixed amplitude and pulse length whenever there is an abrupt reduction in secondary electron current due to the electron beam crossing the seam.

3. A method in accordance with claim 1 which includes the additional step of supplying substitute pulses to a flip-flop gate in the event that one of the aforesaid first mentioned pulses is not generated by the action of the beam crossing the seam.

4. A method in accordance with claim 1 including the additional step of locking out extraneous and noise pulses so as to prevent them from triggering a bistable flip-flop gate in said bistable electronic circuit.

5. A method in accordance with claim 1 including the additional step of determining the direction of travel of the electron gun with respect to the seam and maintaining the motion along the seam in the desired direction.

6. A method in accordance with claim 1 including the additional step of dynamically recording the coordinates along the said axes of a series of points along the said seam, with respect to a given reference point on the work.

* * * * *